Oct. 7, 1941.　　　W. O. MICHELSEN　　　2,258,211
TYPEWRITING MACHINE
Filed March 9, 1939　　　4 Sheets-Sheet 1

INVENTOR
W. O. Michelsen
BY Baldwin & Wight
his ATTORNEYS

Oct. 7, 1941.  W. O. MICHELSEN  2,258,211
TYPEWRITING MACHINE
Filed March 9, 1939  4 Sheets-Sheet 3

INVENTOR
W. O. Michelsen
BY Baldwin & Wight
his ATTORNEYS

Oct. 7, 1941.　　W. O. MICHELSEN　　2,258,211
TYPEWRITING MACHINE
Filed March 9, 1939　　4 Sheets-Sheet 4

INVENTOR
W. O. Michelsen
BY Baldwin & Wight
his ATTORNEYS

Patented Oct. 7, 1941

2,258,211

UNITED STATES PATENT OFFICE 2,258,211

TYPEWRITING MACHINE

William O. Michelsen, Woodhaven, N. Y., assignor to Royal Typewriter Company, Inc., New York, N. Y., a corporation of New York Application March 9, 1939, Serial No. 260,841

27 Claims. (Cl. 197—66)

This invention relates to typewriting machines, and more particularly to power-driven typewriter carriage return mechanism. Various kinds of power-driven mechanism for returning typewriter carriages after typing of lines heretofore have been proposed. Mechanism constructed in accordance with the present invention embodies numerous improvements in structure and has novel operating advantages, as will be pointed out hereinafter.

An object of the invention is to provide simple, compact, power-driven typewriter carriage return mechanism which is so constructed as to be very easily attachable to a standard typewriter in such position as not substantially to increase the total space occupied by the typewriter and so as not to interfere with the servicing of the usual typewriter parts.

Another object is to provide carriage return mechanism controlled, for starting, by a conveniently positioned key operable by a very light touch.

Another object is to provide carriage return mechanism including a motor and means adapted to be driven by the motor, as by being clutched thereto, for interrupting the carriage return drive.

Another object is to provide carriage return mechanism including a motor and a driving clutch, and a brake for slowing down the motor when the carriage has almost reached the end of its return travel so as to lessen clutch pressure and thus facilitate disengagement of the clutch.

Another object is to provide carriage return mechanism and control mechanism therefor including means for retarding the carriage return movement during the latter part of the carriage return travel to minimize shocks and noise.

Another object is to provide carriage return drive mechanism including a slip clutch for permitting the carriage to stop during continued operation of the driving motor in case the carriage is accidentally obstructed during its return movement and before it reaches the end thereof.

Another object is to provide a combined power-operated carriage return and line spacing mechanism and a manually operable line spacing mechanism, the two mechanisms being so related that the handle of the manually operable mechanism will not be rocked by operation of the power operated line spacing mechanism.

Another object is to provide a power operated carriage return mechanism and manually operable line spacing mechanism, the latter including a handle adapted to yield in the event the operator's hand or some object is caught between the handle and the typewriter frame during power-operated carriage return.

A further object is to provide carriage return mechanism so supported and housed as to secure freedom from the operator's view of irritating moving objects.

Other objects will become apparent from a reading of the following description, the appended claims, and the accompanying drawings, in which:

Figure 15 is a rear view of parts of mechanism controlling the carriage return motive and driving mechanism, the parts being shown in positions occupied when the carriage return drive is not operating;

Figure 21 is an elevation of a motor control switch;

Figure 22 is a view looking at right angles to Figure 21;

Mechanism embodying the invention may be applied to or incorprated in various kinds of typewriters. For the purposes of illustration, a preferred form of mechanism embodying the invention is shown as being applied to a Royal Standard typewriter, the general construction of which is well known. The typewriter includes a main frame or housing generally designated A and a carriage B mounted on the frame for the usual letter spacing and return movements. A platen 1, mounted in the customary manner on the carriage, is equipped with a line spacing ratchet 2, which is adapted to cooperate with a pawl 3 carried by a line spacing rock lever 4. A spring motor of usual construction including a winding drum 5, around which is wrapped a draw-band 6, is provided for moving the carriage in letter spacing direction under the control of an escapement mechanism including an escapement rack 7 supported on the carriage as at 8.

Figures 1, 2, 3, 4, 5, 6:
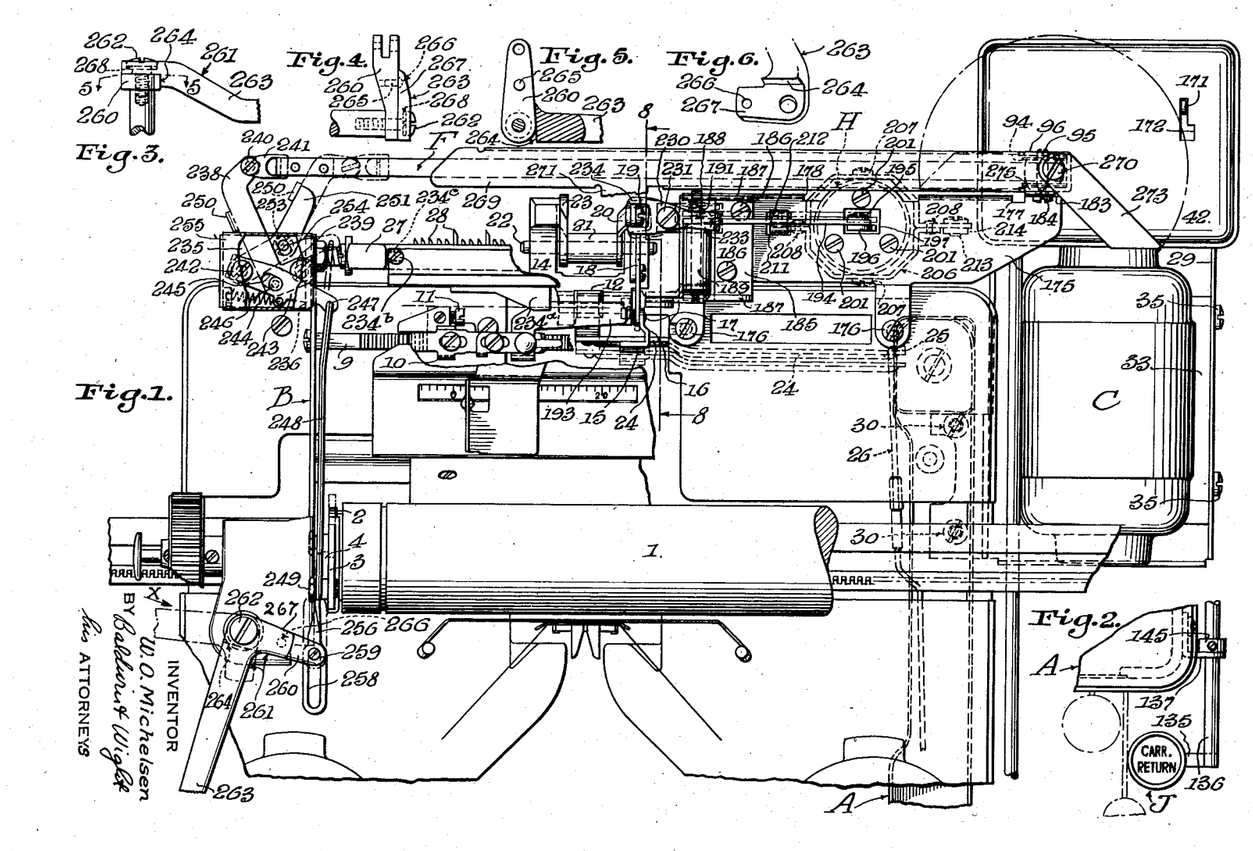
Figure 1 is a fragmentary top plan view of a typewriter with carriage return mechanism embodying the invention applied thereto.
Figure 2 is a fragmentary top plan view of a corner of the typewriter key board and showing a carriage return key.
Figure 3 is a fragmentary elevational view of a manually operable line spacing lever as it appears when looking in the direction of the arrow X in Figure 1.
Figure 4 is a fragmentary elevational view of the manually operable line spacing lever as seen when looking from the left of Figure 3 and, after being thus viewed, being rotated through ninety degrees.
Figure 5 is a detail section taken on the line 5—5 of Figure 3.
Figure 6 is a fragmentary bottom perspective view of a line spacing lever handle.

A margin stop bar 9 supported on the carriage serves to mount a left margin stop 10 having an adjustable abutment screw 11 arranged to cooperate with a center stop 12 for limiting movement of the carriage in the return direction (to the right, as viewed in Figure 1). The center stop 12 may operate in connection with tabulating mechanism such, for example, as is disclosed in the United States patent to Myers, No. 2,007,611, granted July 9, 1935. As shown, the center stop is pivoted as at 13 on a bracket 14 carried by the frame A, and is provided with a lower arm extension 15 formed with an ear 16 pivotally connected as at 17 to an adjustable-length link 18. The link 18 is formed with a vertically extending portion pivotally connected as at 19 to a crank arm 20 on one end of a hub 21 pivoted as at 22 on the bracket 14. The other end of the hub 21 is equipped with a tabular finger 23.

The lower arm 15 of the center stop is provided with a horizontally extending arm 24 having a depending projection 25 connected to a pull rod 26 the front end of which is connected in a known manner to a margin release key and to a tabular key (not shown). A tabular stop frame 27 mounted on the carriage is equipped with a plurality of tabular stops 28 which can be positioned selectively to engage the tabular finger 23 so as to effect desired control of tabular operations. Normally the center stop 12 and tabular finger 23 will be in the positions shown in Figure 1 and in full lines in Figure 8, but, when the tabular key or the margin release key is depressed so as to pull the rod 26 forwardly, the top of the center stop will be moved rearwardly, clear of the path of the abutment screw 11 of the margin stop 10, and the upper end of the crank arm 20 and the pivot 19 will move forwardly. The significance of such forward movement of these intermediate parts of the tabulating and margin release mechanism will become apparent hereinafter.

The left margin stop 10 cooperates with the center stop 12 in a conventional manner, but is constructed or equipped to cooperate also with means for cutting off the carriage return motor and/or for effecting braking or slowing down of the carriage as it approaches the end of its return movement. In other respects, the construction and operation of the parts thus far described are known and do not per se constitute the present invention. Mechanism embodying the invention includes other parts, to be described, organizations of such other parts, and combinations thereof with the known parts described above.

In its general nature, mechanism embodying the invention includes a motor C (Figures 1, 7, and 12) arranged to drive a winding drum D (Figures 7, 11, 12, 13, 16, and 18) through a clutch E (Figures 12, 13, 16, and 18). The drum D is equipped with a pull band F (Figures 1, 7, 11, 12 and 13) connected to mechanism which when pulled by the band first effects line spacing rotary movement of the platen and then moves the carriage in the return direction. A yieldable tensioning device G (Figures 18 and 19) prevents the band F from becoming slack if the carriage is moved manually on its return stroke, that is, toward its starting position at the right hand end of the frame A. A braking device or dash pot H (Figures 1 and 7) is arranged to retard the carriage as it approaches the end of its return stroke, and mechanism is provided for disengaging the clutch E and opening a motor control switch I (Figures 15, 16, 21, and 22) to stop the motor C when the carriage has reached the end of its return movement. The arrangement is such that depressing of a carriage return key J (Figures 2 and 15) will effect closing of the switch I and engagement of the clutch E so that the motor will start, first effecting line spacing movement of the platen and then moving the carriage to position it at rest in readiness for the starting of another line of typing. The carriage will be stopped automatically at the end of its return movement irrespective of whether the key J has been released after being depressed or held down. Other features of construction and operation will become apparent from the detailed description following.

Figures 16, 17, 18, 19, 23, 24:
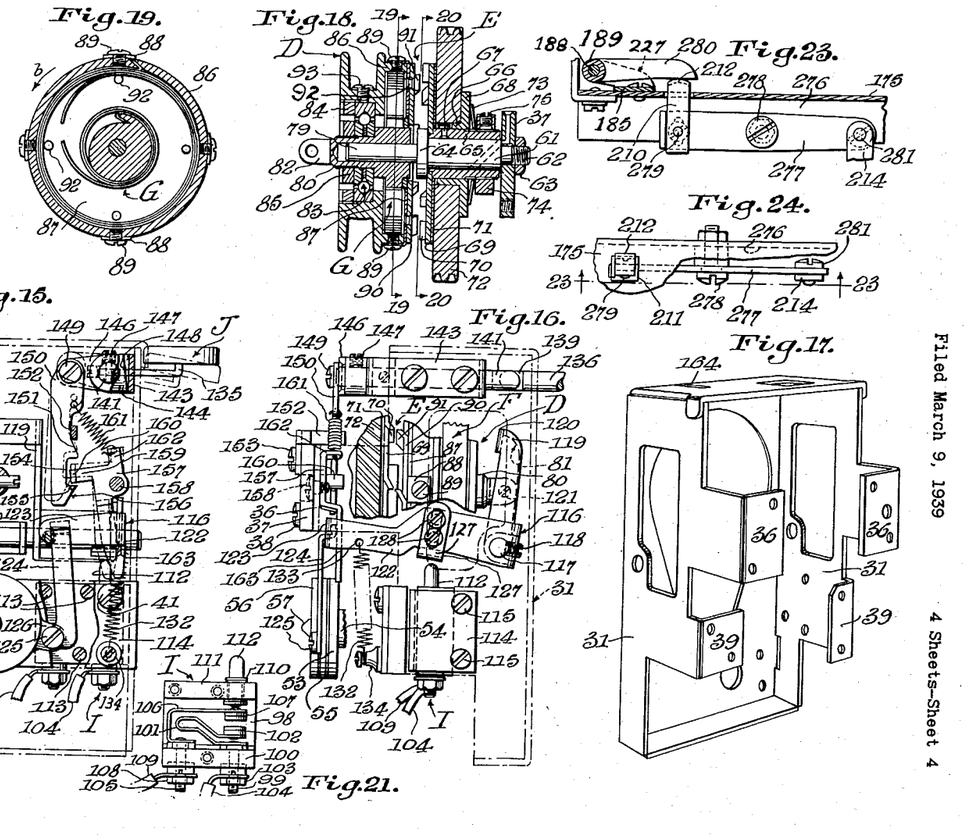
Figure 16 is a view looking from the right side of Figure 15.
Figure 17 is a perspective view of a mechanism frame.
Figure 18 is a detail sectional view of a gear, clutch, and winding drum assembly.
Figure 19 is a section on the line 19—19 of Figure 18.
Figure 23 is a fragmentary section showing parts of a modified mechanism, the section being taken on the line 23—23 of Figure 24.
Figure 24 is a top plan view of parts shown in Figure 23.
Figure 20:
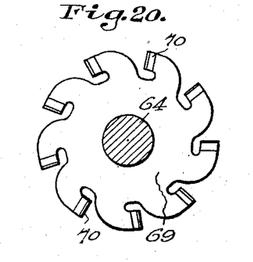
Figure 20 is a section on the line 20—20 of Figure 18.

A plate 29 secured to the frame A by screws 30 supports a mechanism frame 31 connected to the plate 29 by screws 32. The motor C is secured to a block 33 of cushioning or sound-deadening material, such as fibre, by screws 34, and the block is connected to the plate 29 by screws 35. As shown in Figure 17, the mechanism frame 31 is formed at its rear side with upper ears 36 on which is mounted a supporting plate 37 secured to the ears by screws 38, the mechanism frame also being formed with lower ears 39 to which a supporting plate 40 is connected by screws 41. A housing or cover 42 fits over the frame 31.

Figures 11, 12, 13, 14:
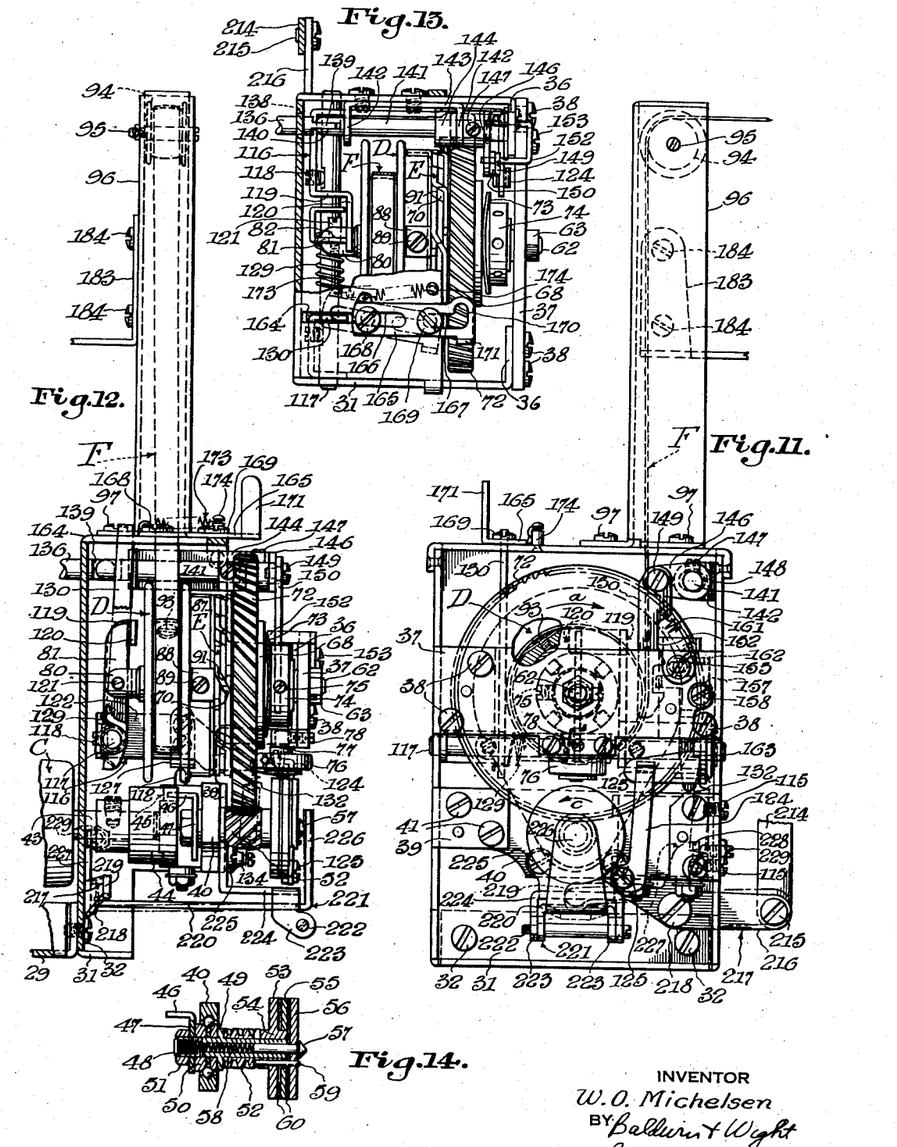
Figure 11 is a rear view of the carriage returning mechanism with its cover or mask removed, the parts being shown in operating or carriage-returning positions.
Figure 12 is a left side view of the mechanism shown in Figure 11, a part of a mechanism frame being omitted to show the mechanism more clearly.
Figure 13 is a plan view of the mechanism shown in Figures 11 and 12, the top of a mechanism frame being shown partly broken away.
Figure 14 is a detail sectional view showing a driving pinion, friction clutch, and motor brake.

The motor shaft 43 extends rearwardly from the motor C, and is equipped with a coupling member 44 provided with an end recess 45 which receives loosely an eccentrically disposed pin 46 formed on a coupling washer 47 secured to a pinion shaft 48, as shown in Figure 14. The shaft 48 is formed with a flange 49 against which is abutted a split inner anti-friction bearing race 50 held up against the flange 49 by means of a nut 51 on the threaded end of the pinion shaft. The outer race of the anti-friction bearing is formed directly in the supporting plate 40. The arrangement is such that the pinion shaft 48 is coupled flexibly to the motor shaft 43 to be driven thereby even though the two shafts be not aligned with minute accurateness. A pinion 52, preferably formed with helical teeth, is secured to the pinion shaft 48 so as to turn in unison therewith.

A friction clutch, operable in a manner to be described later to effect stopping of the motor when the carriage has reached the end of its return travel, is mounted on the outer end of the pinion shaft. It includes an inner clutch disc 53 provided with a hub 54 fitting over and fixed to the end of the pinion shaft 48, an intermediate disc 55 journalled upon the outside of the hub 54, and an outer disc 56 to which is secured axially a pin 57 which extends into the hollow adjacent end of the pinion shaft, being urged outwardly by a coil spring 58. Secured to the outer disc 56 is a pin 59 which extends into an opening in the hub 54 of the disc 53, thus coupling the discs 53 and 56 for concurrent rotation. Friction clutch lining 60 is interposed between the discs 53 and 55 and the discs 55 and 56. Since the disc 53 is fixed to the pinion shaft 48, and since the pin 59 connects the disc 56 to the disc 53, the discs 53 and 56 are constrained to rotate together with the pinion and pinion shaft. However, when the discs 53 and 56 are out of frictional clutching connection with the intermediate disc 55, the intermediate disc is free to remain stationary while the discs 53 and 56 rotate. When the disc 56 is pushed inwardly against the urge of the spring 58 to effect frictional engagement between the friction clutch lining 60 and the discs 53, 55, and 56, the intermediate disc 55 will partake of rotary movement with the discs 53 and 56.

The motor C is arranged to drive the winding drum D through the coupling 44, pinion 52, and clutch E and related parts which will be described next. Referring particularly to Figure 18, a stub shaft 61 has its reduced end 62 extending through an opening in the upper supporting plate 37, a nut 63 having threaded engagement with the reduced end 62 of the shaft 61 for securing the shaft to the plate 37. The shaft 61 is formed with a flange 64 axially spaced from the plate 37, and a sleeve 65 is mounted for rotation on the shaft 61 between the flange 64 thereof and the supporting plate 37. A bushing 66 is mounted on the outside of the sleeve 65 and is constrained to rotate therewith by means of a pin and slot connection 67 which permits axial movement of the bushing relative to the sleeve. The bushing is formed with a peripheral flange 68 which is spaced axially from the shaft flange 64. A clutch disc 69 formed with teeth 70 is interposed between the stub shaft flange 64 and a rabbeted portion of the adjacent end of the sleeve 65, the disc being backed by a friction disc 71. A gear 72 is mounted on the bushing 66 between the friction disc 71 and the bushing flange 68, the latter being urged against the gear 72 by a spring washer 73 which may be adjustably tensioned by a nut 74 having threaded engagement with the sleeve 65, the nut 74 being locked in adjusted position by means of a set screw 75. The motor pinion 52 thus drives the gear 72, and the latter drives the clutch disc 69 through the interposed friction disc 71, the arrangement being such that, if for any reason the carriage encounters resistance to its return travel before the motor C has been stopped, the gear 72, although continuing to rotate, will slip on the friction disc 71, permitting the carriage to stop without breakage of any of the parts.

The use of a helical tooth pinion 52 and helical tooth gear 72 is desirable in order to provide for quiet operation. The helical teeth of course will produce an end thrust on the gear 72 toward the rear of the mechanism frame 31. To counteract such end thrust, an anti-friction thrust bearing 76 is supported on a block 77 secured to the supporting plate 37 by screw 78, the outer race of the bearing 76 being disposed to contact with the rear face of the gear 72. If desired, the helical tooth pinion and gear may be replaced by an ordinary pinion and spur gear, one being of non-metallic material, in which case the anti-friction thrust bearing 76 may be dispensed with.

To the left of the flange 64 the shaft 61 is formed with a reduced diameter extension 79 on which is mounted for sliding movements a sleeve 80, which is prevented from rotating by a clutch-operating arm 81 extending into a slot 82 at the front end of the sleeve as shown in Figures 12, 13, and 15. Other functions of the arm 81 will be described later. An anti-friction bearing generally designated 83 is interposed between the sleeve 80 and winding drum D, an exteriorly threaded nut 84 and an internally threaded nut 85 securing the outer and inner bearing races to the drum D and sleeve 80 respectively. The winding drum is formed to provide a spring housing comprising a circumferential flange 86 and an end plate 87 formed with ears 88 overlying the outer surface of the flange 86 and serving with screws 89 to secure the end plate 87 to the flange 86. A clutch disc 90 formed with teeth 91 is secured to the end plate by rivets 92, the clutch disc being so disposed that the teeth 91 thereof will cooperate with the teeth 70 on the clutch disc 69 when the winding drum is moved rearwardly, that is, toward the gear 72.

The pull band F is wrapped around the winding drum D, having one of its ends secured thereto by a screw 93. The unwound portion of the band F extends upwardly and over a pulley or roller 94 journalled as at 95 on a bracket 96 secured to the mechanism frame 31 by screws 97. The band extends from the roller 94 toward the left, and is connected to the carriage in a manner to be described later, the arrangement being such that when the motor C runs the winding drum D will rotate in the direction of the arrow $a$ in Figure 11, causing the band F to be wound upon the drum and pulling the carriage toward the right as viewed in Figure 1.

If, while the motor C is not running and the clutch discs 69 and 90 are disengaged, the carriage should be moved manually toward the right, there would be a tendency for the band F to become slackened. To prevent any actual slackening of the band, a spring G, mounted inside the circumferential flange 86, is connected at its opposite ends to the sleeve 80 and the flange 86, the spring being tensioned so as constantly to urge the winding drum D in the direction of the arrow $b$ in Figure 19, thus holding the band taut.

Referring now to the mechanism for controlling the starting and stopping of the motor C and the engaging and disengaging of the clutch E, the switch I, connected in circuit with the motor, includes, as shown in Figures 21 and 22, a channel-shaped switch body 98 of suitable insulating material. A screw 99 extending through one flange 100 of the switch body supports a resilient conducting member 101 equipped with a contact point 102, a nut 103 securing a circuit connection member 104 to the screw 99. A screw 105 extends through and secures to the flange 100 a yieldable conducting member 106 equipped with a contact point 107 so positioned as to engage the contact point 102 when moved downwardly. A nut 108 secures a circuit connection 109 to the screw 105. A bushing 110 extending through the other flange 111 of the switch body 98 receives for sliding movements a plunger 112 operable by means to be described for pushing downwardly on the conducting member 106 to move its contact point 107 into engagement with the contact point 102 for closing the motor circuit. The switch body and parts carried thereby are mounted by screws 113 on an angle plate 114 which in turn is connected by screws 115 to the mechanism frame 31. Preferably, a fuse, switch condenser, and adjustable line resistor to control the motor speed are connected in circuit with the motor and housed within the mechanism frame 31. These parts may be of conventional form and are not shown in the drawings.

A common control member is employed for operating the plunger 112 of the switch I and for effecting shifting of the sleeve 80 to engage or disengage the clutch E. In the form shown this member comprises a lever generally designated 116 and fixed to a shaft 117 by means of a set screw 118, the shaft being pivoted to the side walls of the mechanism housing 31. The lever 116 includes a vertically extending arm 119 formed at its upper extremity with an ear 120 disposed behind and having one-way operating connection with the upper end of the clutch-operating arm 81, which is freely pivoted at its lower end on the shaft 117 and is pivotally connected to the sleeve 80 by a pintle 121. The lever 116 also includes a horizontally and rearwardly extending arm 122, the rear end of which is formed with an ear 123 to which is connected the upper end of a link 124, the lower end of this link being pivoted at 125 to an ear 126 on the intermediate clutch disc 55. Mounted on the arm 122 of the lever 116 is a presser piece 127 which is held in adjusted position on the arm by means of screws 128, the presser piece 127 being so disposed as to engage and press downwardly on the switch plunger 112 when the lever 116 is rocked to swing the arm 122 thereof downwardly.

A spring 129 coiled around the shaft 117 has one end hooked to the lower end of the clutch-operating arm 81 above the shaft 117, as shown in Figure 15, the other end of the spring being hooked at a point below the shaft to the heel or bottom end of an arm 130 secured to the shaft by a set screw 131. As hereinafter will be described in more detail, the arm 130 is capable of preventing rocking movement of the lever 116 for rendering the control mechanism incapable of starting the motor C and engaging the clutch E. However, in all positions of the arm 130, the spring 129 is under tension, tending to move the clutch-operating arm 81 rearwardly, that is, in a direction to move the clutch disc 90 into operative engagement with the clutch disc 69. Except when the carriage is being returned, the upper end of the clutch-operating arm 81 is held in its forward position against the urge of the spring 129 by the ear 120 on the arm 119 of the lever 116, which normally is latched in the position shown in Figures 15 and 16 by means hereinafter described. A spring 132 is connected at its upper end as at 133 to the arm 122, and at its lower end is connected to a fixed post 134. The spring constantly urges the arm 122 downwardly, and, when the arm is permitted to move downwardly, the ear 120 on the arm 119 will move rearwardly, permitting the upper end of the clutch-operating arm 81 also to move rearwardly under the urge of the spring 129 so as to shift the sleeve 80 and connected clutch disc 90 rearwardly to effect driving connection of the clutch discs 90 and 69. During downward movement of the arm 122, the presser piece 127 thereon will engage the plunger 112 and move the latter downwardly to close the switch I. It will be observed that, when the lever 116 rocks in a direction to close the switch I, the ear 120 moves relatively away from the clutch-operating arm 81. Thus, in the rare instances in which the clutch teeth 70 and 91 are at rest exactly opposite each other, their mutual engagement, although preventing movement of the clutch-operating arm 81, will not prevent movement of the lever 116 to close the switch I to start the motor. The instant the motor starts the clutch disc 69 will start to rotate, causing the teeth 70 to clear the teeth 91 and permitting the spring 129 to rock the arm 81 and move the sleeve 80 and clutch disc 90 to engage the latter with the clutch disc 69. The mechanism for actuating the lever 116 to cause it to effect such control of both the switch I and the clutch E will now be described.

The carriage return key J is mounted on an arm 135 carried at the front end of a shaft 136 which is journalled in a bracket 137 carried on the frame A, the rear end of the shaft extending through an oblong opening 138 in the mechanism frame. The extreme rear end of the shaft 136 is flattened as at 139 and extends into a slot 140 in an extension shaft 141 journalled in ears 142 of a bracket 143 supported on the mechanism frame 31. A collar 144 on the extension shaft 141 prevents rearward movement of the shafts 141 and 136, and a collar 145 secured to the shaft 136 adjacent the bracket 137 prevents forward movement of the shaft 136.

A crank arm 146 is secured to the extension shaft 141 by means of a set screw 147, the hub of the arm cooperating with the adjacent bracket ear 142 to prevent forward movement of the extension shaft 141. The collar 144 is formed with a flat side 148 adapted to engage along its upper and lower edges respectively with the bracket 143 for limiting rocking movement of the shafts 136 and 141. Pivoted at 149 on the end of the crank arm 146 is a depending catch plate 150, which is formed with an inclined cam edge 151 positioned to engage a stop 152 held in adjusted position on the supporting plate 37 by a screw 153. Below its cam edge 151 the catch plate 150 is formed with a recess 154, the lower wall of which provides a shoulder 155. The catch plate is formed below this shoulder with a cam edge 156 which is inclined reversely to the cam edge 151 previously referred to.

A bell crank 157, pivoted as at 158 on the mechanism frame, is formed with an arm 159 having an ear 160 normally positioned in the recess 154 of the catch plate 150 as shown in Figure 15. A spring 161 interposed between another arm 162 of the bell crank 157 and the catch plate 150 urges the catch plate against the stop 152 and urges the bell crank 157 in a counterclockwise direction as viewed in Figure 15 so as to position a latch hook 163 on the depending part of the bell crank 157 under the arm 122 of the lever 116. Normally, the latch hook 163, being positioned under the arm 122, will support the latter, holding it in the position shown in Figures 15 and 16, which is the position it occupies when the switch I is open and the clutch E is disengaged. When it is desired to effect return travel of the carriage, the key J is depressed, thus rocking the shafts 136 and 141 and the crank arm 146 so as to raise the catch plate 150. As the catch plate moves upwardly, its inclined cam surface 151 will act upon the fixed stop 152 to cause the catch plate to swing in a clockwise direction as viewed in Figure 15. The upward movement of the catch plate 150 will, because of the contact of the shoulder 155 thereon with the ear 160 on the bell crank 157, rock the bell crank in a clockwise direction and move the hook 163 thereon from underneath the arm 122 of the lever 116. The parts are so formed and adjusted that the shoulder 155 will move from underneath the ear 160 and become disengaged therefrom immediately after the hook 163 on the bell crank 157 becomes disengaged from the arm 122. As soon as the hook 163 has moved from underneath the arm 122, the spring 132 will swing the arm downwardly about the shaft 117, and the presser piece 127 will engage the switch plunger 112 and press it downwardly so as to close the motor circuit and start the motor. Also, during the downward movement of the arm 122, the arm 119 and ear 120, which move in unison with the arm 122, will move rearwardly, thus permitting the spring 129 to move the upper end of the clutch-operating lever 81 rearwardly so as to shift the clutch disc 90 into operative engagement with the clutch disc 69. Continued operation of the motor will drive the winding drum D through the connections hereinbefore described so as to wind up the pull band F, effect line spacing, and then effect return travel of the carriage.

In order to render the automatic line spacing and carriage return mechanism inoperative so as to limit the machine to manual operation for performing these functions, means are provided for holding the arm 130, the shaft 117, and the lever 116 in the positions shown in Figures 15 and 16. For this purpose the arm 130 extends upwardly through an opening 164 in the top of the mechanism frame 31, the opening being elongated in the direction of rocking movement of the arm 130 so as to permit the arm to move back and forth freely when required to do so for permitting operative movements of the lever 116. A plate 165 having slots 166 and 167 is mounted for sliding movements on top of the mechanism frame 31, being guided by shoulder screws 168 and 169 passing through the slots 166 and 167 respectively. The slot 167 is formed with an offset portion 170, permitting the adjacent end of the plate 165 to be moved laterally so as to position the screw 169 relatively in the off-set portion 170 for retaining the plate against rearward movement from the dotted line position shown in Figure 13 to the full line position. Manipulation of the plate 165 is facilitated by a finger piece 171 thereon which extends upwardly through an opening 172 in the mechanism frame cover 42. A spring 173 interposed between the plate 165 and a fixed post 174 constantly urges the plate rearwardly to the position shown in full lines in Figure 13. When the plate is in this position the arm 130 can partake of the rocking movements in the opening 164 necessary to permit operative movements of the lever 116. When it is desired to render the mechanism inoperative, the plate 165 is moved forwardly to the position shown in dotted lines in Figure 13 against the urge of the spring 173, causing the end of the plate adjacent the arm 130 to engage the upper end of the arm and move it or hold it in such a position that the lever 116 will be held in the position shown in Figures 15 and 16.

Mechanism for retarding or braking the carriage travel when the carriage approaches the end of its return movement, and for stopping the motor and disengaging the clutch E when the carriage reaches the extreme end of its return travel is, in part, carried by a bracket 175 secured to the top of the frame A by screws 176. The rear of the bracket 175 is provided with overhanging mutually spaced flanges 177 and 178. Screws 179 connect a finger 180 to the flange 178, the projecting end of the finger being tapered along its upper and lower edges and fitting into an opening 181 in the usual tabulator finger cover 182, thus bracing the bracket 175. To hold the bracket still more firmly in place, it is formed with an ear 183 which is secured to the vertically extending bracket 96 by screws 184.

A bracket 185 secured on the top of the bracket 175 by screws 186 is provided with spaced ears 187 on which is carried a shaft 188 mounting the hub 189 of a bell crank lever generally designated 190. The length of the hub 189 is somewhat less than the distance between the two ears 187, so that the bell crank lever may be shifted along the shaft 188 for a purpose to be explained later. Normally, however, the bell crank lever is held in its forward position by means of a spring 191 interposed between the rear end of the hub 189 and the rearmost ear 187 on the bracket 185. One arm 192 of the bell crank lever 190 extends upwardly and normally is disposed in the path of a projection 193 on the left margin stop 10. Another arm 194 of the bell crank lever is pivotally connected as at 195 to the top end of a link 196 which extends through an opening 197 in the bracket 175 for connection to the carriage retarding device H. The bottom end of the link 196 is pivotally connected as at 198 to a piston 199 mounted in a cylinder 200 which is secured underneath the bracket 175 by means of screws 201. The piston 199 is urged upwardly by a spring 202 which yields to permit the piston to move downwardly when the margin stop projection 193 engages the arm 192 of the bell crank lever 190 to rock the lever in a counterclockwise direction as viewed in Figure 7, the primary function of the spring 202 being to return the link 196 and bell crank lever 190 to the position shown in full lines in Figure 7. The retarding action of the dash pot H is due to the restricted release of air from underneath the piston through a vent 203 at the bottom of the cylinder and adjustable by means of a needle valve 204 held in adjusted position by a lock nut 205. It will be understood that the dash pot H functions only to retard the carriage during the latter part of its return travel, and has no part in definitely stopping the carriage.

The stopping of the carriage is effected by mechanism adapted to transmit movement from the bell crank 190 to the pin 57 for pressing the clutch discs 53, 55, and 56 into operative frictional engagement. This mechanism includes a lever 206 pivoted as at 207—207 to the cylinder 200. The lever conveniently may be composed of two similar pieces riveted together as at 208—208, the central portions of the pieces lying on opposite sides of the cylinder 200 and the end portions of the pieces being disposed alongside of and in abutting relation to each other. Adjustably secured to one end of the lever 206 by a screw 209 is a short link 210 which extends up through an opening 211 in the bracket 175 and has its upper end bent over to provide a horizontally disposed portion 212 positioned under the arm 194 of the bell crank lever 190. The other end of the lever 206 is pivotally connected as at 213 to a link 214, the lower end of which is pivoted as at 215 to one arm 216 of a three-armed lever 217 pivoted as at 218 on the mechanism frame 31. Another arm 219 of the lever 217 is disposed over and adapted to engage a horizontally extending arm 220 of a rocking lever 221 pivoted as at 222 on the ears 223 of a bracket 224 secured to the supporting plate 40 by means of screws 225. The rocking lever 221 includes also a vertically extending arm 226 which is disposed at the end of and in engagement with the pin 57 carried by the friction clutch disc 56. When the carriage approaches the end of its return travel, the margin stop projection 193 will rock the bell crank lever 190 until the lever arm 194 engages the horizontally disposed part 212 of the link 210 and moves the link downwardly so as to rock the lever 206 and lift the link 214. This will rock the lever 217 and move the arm 219 thereof downwardly, also moving the arm 220 of the rocking lever 221 downwardly, and causing its vertically extending arm 226 to press inwardly on the pin 57 to effect operative frictional engagement of the clutch discs 53, 55, and 56 and the interposed friction clutch lining 60. The intermediate disc 55 then will be carried in the direction of the arrow c, thus moving the link 124 upwardly and moving the arm 122 of the lever 116 to the position shown in Figures 15 and 16, so as to open the switch I, stopping the motor, and also effecting disengagement of the clutch E. As is well known, there always is a little back lash in the escapement mechanism of typewriting machines which causes the carriage to rebound or move back in letter space direction about half a letter space, or approximately one-sixteenth inch, after its left margin stop has engaged the center stop at the end of the return travel. This rebound is sufficient to relieve pressure of the arm 194 of the bell crank lever 190 on the link 210. Consequently, axial pressure on the pin 57 of the friction clutch will be released, and the intermediate disc 55 will be operatively disconnected from the discs 53 and 56. The intermediate disc 55 thus will be free to be moved under the urge of the spring 132 when the key J is depressed again to start another return movement of the carriage. A third arm 227 of the three-armed lever is formed with a near 228 adapted to engage an adjustable stop screw 229 on the mechanism frame 31 so as to limit rocking movement of the three-armed lever 217. Adjustment of the stop screw 229 will vary the upward movement of the arm 219 of the lever 217 and thus adjust the clearance between the friction clutch plates 53, 55, and 56.

Sometimes it is desirable to clear the left margin stop, that is, to move the carriage to the right past the normal limit of its return travel. In the form of typewriter disclosed herein, this is accomplished by moving the center stop 12 rearwardly out of the path of the abutment screw 11 and the margin stop 10, and also by moving the bell crank lever 190 rearwardly so that its arm 192 will be disposed out of the path of the margin stop extension 193. To accomplish such movement of the bell crank lever 190 a shifting lever 230, pivoted as at 231 on a bracket 232, has one end forked at 233 to embrace loosely the bell crank arm 194. The other end of the lever 230 is forked as at 234 to embrace loosely the vertically extending part of the adjustable link 18 of the tabular finger operating mechanism previously referred to. When the margin release key or tabular key (not shown) is depressed, drawing the pull rod 26 forwardly, the adjustable link 18 will be moved forwardly and will rock the lever 230, thus shifting the bell crank lever 190 rearwardly against the urge of the spring 191 so as to move the bell crank lever arm 192 to the rear of the path of the margin stop extension 193. The carriage may then be moved to the right beyond the normal limit of its travel without causing engagement of the margin stop extension 193 with the bell crank lever arm 192.

Figures 7, 8, 9, 10:
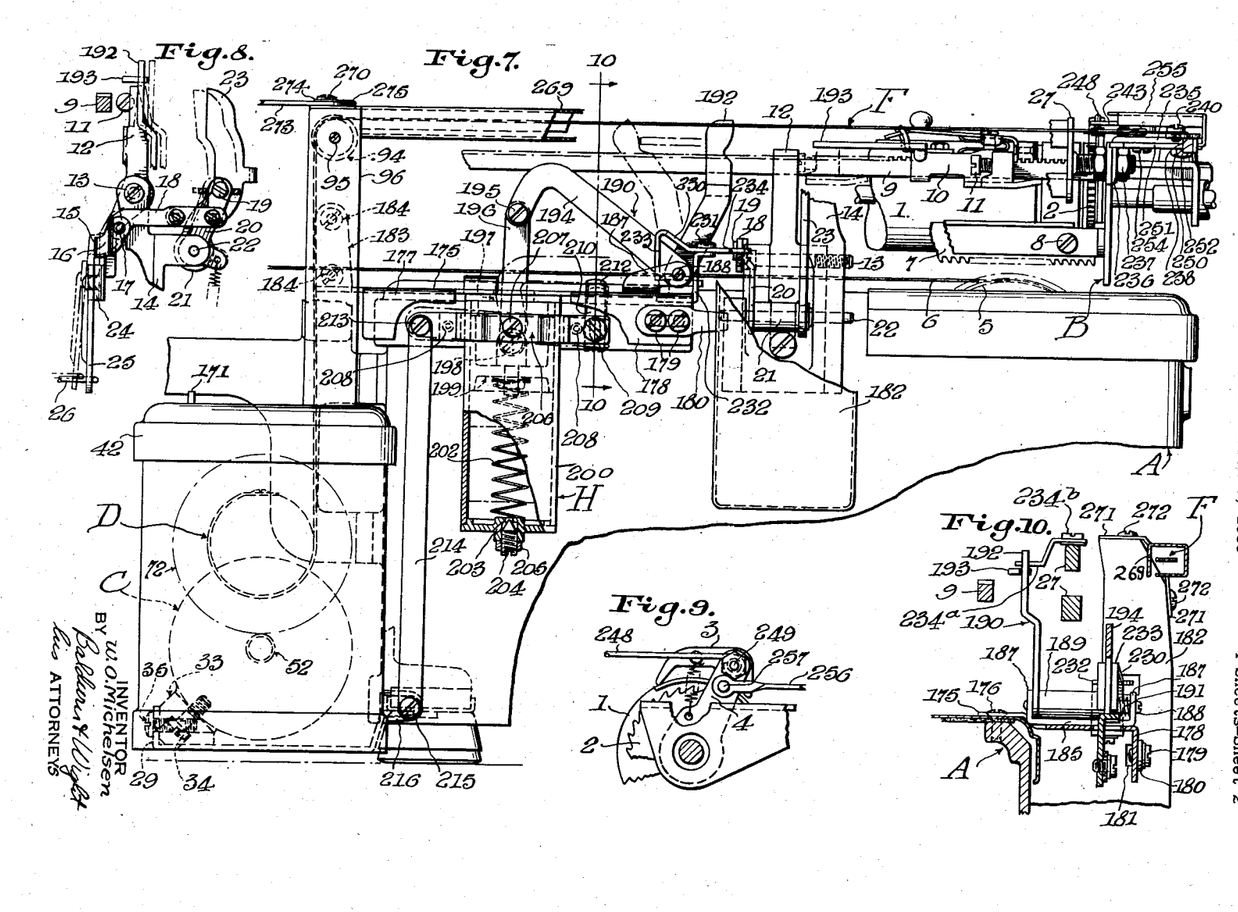
Figure 7 is a fragmentary rear view of a typewriter showing mechanism embodying the invention applied thereto.
Figure 8 is a detail section taken on the line 8—8 of Figure 1.
Figure 9 is a detail view of the left end of platen and parts of an associated line-spacing mechanism.
Figure 10 is a fragmentary view in vertical section on the line 10—10 of Figure 7.

Means are provided for rocking the bell crank lever 190 to stop the motor and disengage the clutch E in the event the key J is depressed after the carriage has been moved to the right beyond the normal limit of its travel. As shown in Figures 1 and 10, an abutment 234ᵃ is secured to the tabular stop frame 27, preferably by two screws, only one 234ᵇ of which is shown. The abutment 234ᵃ projects forwardly and is positioned to trail the margin stop extension 193 with respect to the direction of carriage return movement, and is so disposed that, if the carriage is moved beyond the normal limit of travel to the right, the abutment will engage the arm 192 and rock the bell crank lever 190, whether the latter is in its normal or forward position, or whether it is in its "margin clearing" or rearward position. Thus stopping of the motor and disengagement of the clutch E when the carriage reaches the extreme end of its travel to the right is assured, even though the bell crank lever 190 has been shifted to effect margin release. It is preferred that the abutment be adjustable longitudinally of the tabulator stop frame 27. To this end the abutment is formed with elongated slots through which the attaching screws pass. One slot 234ᶜ through which the screw 234ᵇ passes is shown in Figure 1.

Referring now to the connection between the pull band F and the carriage B, preferably through line spacing mechanism, Figures 1 and 7 show an angle plate 235 provided with a leg 236 which is clamped under the tabular stop frame securing nut 237 on the carriage. A lever 238 is pivotally mounted as at 239 on the plate 235, and has its rear end attached by a screw 240 to a connecting piece 241 at the end of the band F. Also pivoted as at 242 on the plate 235 and overlying the lever 238 is a lever 243 which is urged in a clockwise direction, as viewed in Figure 1, by a spring 244. The lever 243 is formed with a slot 245 into which extends a roller pin 246 carried by the lever 238. The free end of the lever 243 is connected as at 247 to the rear end of a pull rod or link 248, the front end of which is pivotally connected as at 249 to the line space rock lever 4. When the band F pulls the rear end of the lever 238 toward the right as viewed in Figure 1, the roller 246 will bear against the rear wall of the slot 245 to swing the lever 243 rearwardly, thus pulling the rod 248 rearwardly and rocking the line spacing rock arm 4 rearwardly (to the left as viewed in Figure 9) so as to effect line spacing. It is desirable that the carriage be started on its return travel immediately after completion of line spacing movement of the platen. To this end, means are provided for limiting the swinging of the lever 238 under the pull of the band F. A stop lug 250 on the lever 238 is adapted to engage a stop arm 251 mounted adjustably under the plate 235, one end of the stop arm 251 being clamped under a lock nut 252 for the pivot 242 of the lever 243. The stop arm 251 is formed intermediate its ends with a slot 253 through which extends a locking screw 254. By loosening the lock nut 252 and the locking screw 254, the stop arm 251 can be shifted about the pivot 242 so as to vary the movement of the arm 238 which will take place before the stop lug 250 thereon engages the stop arm 251. Preferably, a cover 255 is connected to the plate 235 and extends over the levers 238 and 243.

It is desirable at times to effect manual line spacing, and, to provide for such operation, a link 256 has its rear end pivotally connected as at 257 to the line spacing rock arm 4, and at its front end is formed with a slot 258 which receives a pin 259 carried by the short actuating arm member 260 of a line spacing lever generally designated 261 pivoted on the carriage by a shoulder screw 262. A handle 263, also pivoted as at 262, normally extends substantially transversely to the line of carriage travel and is formed on its lower side with a flat surface or pressure face 264 which is adapted to engage the front edge of the short arm 260 when the handle 263 is moved in a counterclockwise direction, as viewed in Figure 1, so as to move the arm 260 in the same direction, thereby pushing the link 256 and rocking the arm 4 rearwardly to effect manual line spacing in the usual manner. The handle 263 and short arm 260 of the line space lever thus are connected by a one-way drive connection 264—260 in order that the handle 263 may yield and move rearwardly to a position in which it extends substantially parallel to the line of carriage travel, as shown in dotted lines in Figure 1 if the operator should catch his or her hand between the handle and the typewriter when the carriage is being moved on its return travel by the motor C. The handle 263 and the arm 260 should, however, normally be held releasably in the relative positions shown in Figures 1, 3, 4, and 5. To this end a rivet 265 is fixed to the arm 260 with its head disposed to be received by a depression 266 in the lower face of a projection 267 on the handle 263. A spring washer 268 is disposed under the head of the screw 262 and is so tensioned as to permit relative separating movement of the arm 260 and handle 263 so as to allow the depression 266 to move relatively away from the head of the rivet 265, thus allowing the handle 263 to swing to the dotted line position shown in Figure 1. The pin and slot lost motion connection 259—258 between the link 256 and the arm 260 permits the link to reciprocate idly during automatic line spacing without oscillating the line spacing lever 261.

In order to prevent injury to the band F and possible entanglement of paper with the band and pulley 94, a horizontally disposed guard 269 is attached at one end to the bracket 96 by means of a screw 270. Adjacent its other end the guard is provided with ears 271 which are attached to the tabulator finger cover 182 by screws 272.

The screw 270 attaching the right hand end of the guard 269 to the bracket 96 preferably is shouldered so as to serve as a pivot for a swingable paper guide 273 frictionally held under the head of the screw 270 by means of a spring washer 274 (Figure 7). The purpose of the paper guide is to support and prevent the rear overhanging end of a narrow sheet of paper used at the extreme right side of a wide carriage from becoming entangled between and damaged by the rear of the carriage and the carriage return mechanism. The guide 273 is shown in full lines in its operative position in Figures 1 and 7, but is movable to an inoperative position as shown in dotted lines in Figure 1. The movement of the paper guide is limited by means of a stop 275 (Figures 1 and 7).

To recapitulate the operation of the mechanism described above, it will be assumed that the carriage is at rest in its right hand position ready for the starting of a line to be typed. The catch plate 150 will be in the position shown in Figure 15, and the latch hook 163 will be holding the arm 122 up in the position shown in Figures 15 and 16. The switch I will be open, and the ear 120 on the arm 119 will hold the clutch-operating arm 81 in its forward position against the urge of the spring 129 so as to maintain the clutch E disengaged. The typing of the line will then be performed in the usual manner. To effect line spacing and then return travel of the carriage, the key J is depressed, rocking the shaft 136 and extension shaft 141 so as to lift the catch plate 150. Upward movement of the catch plate will move the bell crank lever 157 toward the dotted line position shown in Figure 15, displacing the hook 163 from underneath the lever arm 122, and permitting the arm to be pulled down immediately by the spring 132. Engagement of the catch plate inclined edge 151 with the stop 152 during upward movement of the catch plate will move the catch plate toward the position shown in dotted lines in Figure 15. Immediately after the hook 163 is moved from under the lever arm 122, the catch plate shoulder 155 will move from underneath the ear 160 on the bell crank lever 157, thus permitting the spring 161 to move the bell crank lever 157 to position the hook 163 against the lever arm 122, so that, when the lever arm subsequently is raised, the hook 163 will be moved under it to hold it up. If the operator should not release the key J before the carriage reaches the end of its return travel, the hook 163 of the bell crank lever 157 will nevertheless move under the arm 122 of the lever 116 and will hold the arm 122 up. If, then, the key J is released, the catch plate 150 will descend and the cam edge 156 thereon will slide on the ear 160 of the bell crank lever 157, and swing the catch plate clockwise as viewed in Figure 15 until the catch plate shoulder 155 passes below the level of the ear 160, whereupon the catch plate will swing counterclockwise to position the shoulder 155 under the ear 160. The parts will then be positioned in readiness for the starting of another operation by depressing the key J.

Downward movement of the lever arm 122, effected as described above, will push the link 124 downwardly to position the ear 126 of the intermediate friction clutch disc 55 in the position shown in Figure 11. Downward movement of the lever arm 122 also will close the switch I so as to start the motor C and engage the clutch E. The motor will then drive the winding drum D so as to move the pull band F toward the right as viewed in Figure 1, causing the lever 238 to be rocked from the position shown in full lines to the position shown in dotted lines in Figure 1, thereby rocking the lever 243 and pulling rearwardly on the link 248 to effect line spacing movement of the platen 1. When the stop lug 250 on the lever 238 engages the stop arm 251, continued movement of the band F will move the carriage toward the right. If, during such movement, the operator's hand or any article should be caught between the line space lever handle 263 and the typewriter frame, the handle will yield and move to the position shown in dotted lines in Figure 1, so that no injury will be done to the operator or the typewriter. If the carriage should encounter resistance to its return travel, other than resistance which might be offered by obstructing the line spacing lever, the slip clutch 71—72 will slip, thus interrupting the drive and preventing breakage of parts. When the carriage approaches the end of its return travel, the margin stop projection 193 will engage the bell crank lever arm 192 so as to rock the bell crank 190 against the resistance of the dash pot piston 199, which will retard the speed of the carriage for the remainder of its return travel, and will cause increased tooth pressure in the clutch E. Continued and retarded movement of the carriage finally will cause the bell crank lever arm 194 to press the link 210 downwardly so as the rock the lever 206, raise the link 214, and rock the levers 217 and 221 so as to press the pin 57 inwardly to effect sudden frictional contact of the rotating discs 53 and 56 with the disc 55 which is stationary at the moment the pin 57 is first pressed inwardly. The discs then act as a brake which will cause the motor to slow down, consequently lessening the pressure between the clutch teeth 70 and 91, thus preparing the clutch E for easy disengagement. With the intermediate clutch disc 55 frictionally clutched to the discs 53 and 56, which will be rotating in the direction of the arrow c (Figures 11 and 15), the intermediate disc will be moved with the discs 53 and 56 so as to lift the link 124 and with it the arm 122 of the lever 116 until the hook 163 of the bell crank lever 157 is swung under the lever arm 122 by the spring 161. Movement of the lever 116 to this position will open the switch I and disengage the clutch E. The platen will thus be brought to rest automatically even if the carriage return key J should be held depressed. In order to start the motor C and engage the clutch E again, it is necessary for the key J to be released and then depressed again.

If it is desired to clear the left hand margin, it is necessary only to depress the tabular key or margin release key so as to shift the bell crank lever 190 rearwardly.

The purpose of the carriage-retarding device H is to reduce the impact of the margin stop abutment screw 11 on the center stop 12, thus minimizing harmful shocks and reducing noise. However, the retarding mechanism may be eliminated without interfering with the automatic stopping of the carriage at the end of its return travel. When the retarding device H is not to be used, the flanges 177—178 of the bracket 175 are replaced by a flange 276 extending continuously along the rear of the bracket 175. The lever 206 is replaced with a simple lever 277 pivoted as at 278 on the flange 276. One end of the lever 277 is adjustably secured by a screw 279 to the link 210, the upper end 212 of which is disposed under an arm 280 used in place of the arm 194 on the bell crank lever 190. The other end of the lever 277 is pivotally connected as at 281 to the link 214. When the carriage approaches the end of its return travel, movement of the bell crank lever 190 will cause its arm 280 to press downwardly on the link 210, thus rocking the lever 277 and lifting the link 214, which will open the motor switch I and disengage the clutch E in the manner already described.

It will be apparent that mechanism embodying the invention will effect quick, safe, and quiet performance of the line spacing and carriage returning operations under the control of a single easily operable key. The only appreciable forces resisting depression of the key J are the tension of the spring 161, which is quite light, and the slight frictional drag of the hook 163 at it slides from underneath the lever arm 122. Consequently only a very light pressure or touch is required to depress the key J to start carriage return movement. The flat end 139 and slot 140 connection between the shafts 136 and 141 acts as a flexible or semi-universal joint capable of operatively coupling the shafts when they are at relative heights and positions differing within substantial limits. Consequently the key J may be placed at any one of a number of different locations at the right of the typewriter. The mechanism frame 31 and mechanism carried thereby can be applied as a unit to the typewriting machine and the control shaft 141 and pinion shaft 48 coupled substantially end-to-end respectively with the key shaft 136 and motor shaft 43.

The mechanism disclosed herein embodies the invention in its now preferred form, but various changes may be made in the construction and relative arrangement of the parts without departing from the invention as defined in the claims.

I claim:

1. In a typewriting machine, a main frame; a carriage mounted thereon for letter spacing and return movements; a key-operated shaft journalled on said main frame; a motor mounted on said main frame and having a shaft; a mechanism frame; a carriage return winding drum, driving mechanism, and start-and-stop mechanism therefor mounted on and housed within said mechanism frame and including a control shaft and a drive shaft; means for coupling the control shaft to the key-operated shaft; and means for coupling the drive shaft to the motor shaft, one of said coupling means comprising a flexible coupling device, said two coupling means adapting the mechanism frame with the mechanism housed therein to be applied as a unit to the typewriting machine and said control shaft and drive shaft to be coupled respectively to said key-operated shaft and said motor shaft.

2. In a typewriting machine, a main frame; a carriage mounted thereon for letter spacing and return movements; a plate attached to said main frame at the rear of one end thereof; a motor mounted on said plate; a mechanism frame also mounted on said plate; winding mechanism mounted on said mechanism frame and including a pull band adapted for connection to the carriage; start-and-stop control means for said winding mechanism mounted on said mechanism frame; a bracket secured to said main frame at the rear and top thereof; carriage operable mechanism supported on said bracket; a dash pot mounted by and under said bracket and behind said main frame; means connecting the dash pot to said carriage-operable mechanism; and a carriage-stop-effecting motion transmitting connection between said carriage operable mechanism and said control means.

3. In a typewriting machine, a main frame; a carriage mounted thereon for letter spacing and return movements; a mechanism frame mounted on said main frame; winding mechanism carried by said mechanism frame; a pull band extending from said winding mechanism and upwardly at one end of the main frame; a bracket connected at its lower end to said mechanism frame and extending upwardly at said end of the main frame; a pulley on said bracket and over which said band is trained and from which the band extends longitudinally in the direction of carriage travel for connection to the carriage; a guard substantially surrounding the longitudinally extending portion of the band; and means connecting said guard to said bracket and to said main frame at a point spaced from said bracket.

4. In a typewriting machine, a main frame; a carriage mounted thereon for letter spacing and return movements; a tabulator mechanism cover supported on and at the rear of said main frame; a mechanism frame mounted on said main frame; winding mechanism carried by said mechanism frame; a pull band extending from said winding mechanism and upwardly at one end of the main frame; a bracket extending upwardly at said end of the main frame; a pulley on said bracket and over which said band is trained and from which the band extends longitudinally in the direction of carriage travel for connection to the carriage; a guard substantially surrounding the longitudinally extending portion of the band; and means connecting said guard at spaced points thereon respectively to said bracket and said tabulator mechanism cover.

5. In a typewriting machine, a frame; a carriage mounted thereon for letter-spacing and return movements; a motor; carriage-return driving connections including a clutch between the motor and carriage, said clutch including coengageable elements more easily disengageable from each other inversely with respect to the driving effort being transmitted; means for engaging and disengaging said clutch elements; a normally ineffective impositive friction brake adapted to be effective on said driving connections on the motor side of said clutch for retarding the motor and diminishing the driving effort being transmitted to facilitate disengaging the clutch; and means responsive to carriage travel for applying said brake prior to disengaging movement of said clutch-disengaging means when the carriage reaches a predetermined position during its return travel.

6. In a typewriting machine, a frame; a carriage mounted thereon for letter spacing and return movements; a power-operated motive shaft; carriage return driving connections including a toothed clutch between said shaft and carriage; means for engaging and disengaging said clutch; and means for diminishing clutch tooth pressure to facilitate clutch disengagement comprising an impositive friction brake cooperable with said motive shaft, and a device responsive to carriage movement for applying said brake when the carriage reaches a predetermined position during its return travel and prior to disengaging movement of said clutch-disengaging means.

7. In a typewriting machine, a frame; a carriage mounted thereon for letter spacing and return movements; a motor; a motive shaft driven thereby; carriage return driving connections including a toothed clutch between said shaft and carriage; means for engaging and disengaging said clutch; means active during continued transmission of power from the motor to the carriage for retarding movement of the carriage during the latter part of its return travel and causing thereby increased clutch tooth pressure; and means for diminishing clutch tooth pressure to facilitate clutch disengagement comprising an impositive friction brake cooperable with said motive shaft, and a device responsive to carriage movement for applying said brake when the carriage reaches a predetermined position during its return travel and prior to disengaging movement of said clutch-disengaging means.

8. In a typewriting machine, a frame; a carriage mounted thereon for letter spacing and return movements; a motor; a motor driven shaft; carriage return driving connections including a clutch between said shaft and carriage, said clutch including coengageable elements more easily disengageable from each other inversely with respect to the driving effort being transmitted; control means for starting said motor and engaging said clutch elements to initiate a carriage return movement; a normally ineffective impositive friction brake adapted to be effective on said driving connections between the motor and the clutch; means responsive to carriage return movement prior to disengagement of the clutch for applying said brake to retard the motor, diminish the driving effort being transmitted, and thus to facilitate disengaging the clutch; and means driven by the motor for disengaging said clutch.

9. In a typewriting machine, a frame; a carriage mounted thereon for letter spacing and return movements; a motor; a motor driven shaft; carriage return driving connections including a clutch between said shaft and carriage and including cooperating toothed elements; control means for starting said motor and engaging said clutch elements to initiate a carriage return movement; an impositive friction brake effective on said driving connections between the motor and the clutch; means normally operatively disconnected from the motor and being adapted to be operatively connected thereto for disengaging said clutch elements and stopping said motor; and means responsive to carriage return movement for applying said brake and effecting operative connection between said clutch-disengaging and motor-stopping means and said motor.

10. In a typewriting machine, a frame; a carriage mounted thereon for letter spacing and return movements; a motor; a motor driven shaft; carriage return driving connections including a toothed clutch between said shaft and said carriage; means for disengaging said toothed clutch; a motor brake including a normally stationary shiftable first friction clutch element normally operatively disconnected from said shaft, and a second friction clutch element rotatable with said shaft; means connecting said first friction clutch element to the toothed clutch-disengaging means; and means responsive to carriage travel during the latter part of carriage return movement for effecting frictional driving connection between said two friction clutch elements for braking the motor and moving the first friction clutch element to disengage said toothed clutch.

11. In a typewriting machine, a frame; a carriage mounted thereon for letter spacing and return movements; an electric motor; a motor driven shaft; carriage return driving connections including a toothed clutch between said shaft and said carriage; a motor switch; means for disengaging said toothed clutch, and for opening said motor switch; a motor brake including a normally stationary shiftable first friction clutch element freely journalled on said shaft, and a second friction clutch element constrained to rotate with said shaft and normally being operatively disconnected from said first friction clutch element; means connecting said first friction clutch element to the clutch-disengaging and switch-opening means; and means responsive to carriage return movement for effecting frictional driving connection between said friction clutch elements for braking the motor, shifting said first clutch element, opening the motor switch, and disengaging said toothed clutch.

12. In a typewriting machine, a frame; a carriage mounted thereon for letter spacing and return movements; a motive shaft; carriage return drive connections including a driving clutch between said shaft and the carriage; a device connected to said clutch for disengaging the latter; and means adapted to frictionally connect said shaft to said device for effecting clutch disengagement.

13. In a typewriting machine, a frame; a carriage mounted thereon for letter spacing and return movements; a motive shaft; carriage return drive connections including a driving clutch between said shaft and the carriage; a device connected to said clutch for disengaging the latter; and means operable in response to carriage return movement to frictionally connect said shaft to said device for effecting clutch disengagement.

14. In a typewriting machine, a frame; a carriage mounted thereon for letter spacing and return movements; a motive shaft; carriage return drive connections including a driving clutch between said shaft and the carriage; a first clutch disc connected to said driving clutch and adapted when rocked to effect disengagement of the driving clutch; a second clutch disc connected to rotate with said shaft and normally being operatively disconnected from said first disc; and means for urging said discs relatively into operative engagement to effect rocking of said first disc and disengagement of said driving clutch.

15. In a typewriting machine, a frame; a carriage mounted thereon for letter spacing and return movements; a motive shaft; carriage return drive connections including a driving clutch between said shaft and the carriage; a first friction clutch disc freely journalled on said shaft; a connection between said disc and said driving clutch for disengaging said driving clutch upon rocking of said disc; a second friction clutch disc coaxially supported by and rotatable in unison with said shaft and normally being operatively disconnected from said first disc; and means operable in response to carriage movement during the latter part of the carriage return travel for applying axial pressure to one of said discs to effect frictional driving connection between said two discs and disengagement of the driving clutch.

16. In a typewriting machine, a frame; a carriage mounted thereon for letter spacing and return movements; a motive shaft; carriage return drive connections including a driving clutch between said shaft and the carriage; a first friction clutch disc freely journalled on said shaft; a connection between said disc and said driving clutch for disengaging said driving clutch upon rocking of said disc; a second friction clutch disc coaxially supported by and rotatable in unison with said shaft and normally being operatively disconnected from said first disc; a spring normally urging said discs relatively apart; a stop for limiting action of said spring and thereby fixing the normal clearance between said discs; and means operable in response to carriage movement during the latter part of the carriage return travel for applying axial pressure to one of said discs to effect frictional driving connection between said two discs and disengagement of the driving clutch.

17. In a typewriting machine, a frame; a carriage mounted thereon for letter spacing and return movements; a motor; carriage return driving connections including a shaft between said motor and carriage; means for starting the drive from said motor to said carriage; means for stopping the drive; means for actuating the drive-stopping means, said actuating means including a device adapted to be clutched to and rocked by said shaft; and means including a plurality of coaxial friction discs for clutching said device to said shaft.

18. In a typewriting machine, a frame; a carriage mounted thereon for letter-spacing and return movements; an electric motor having a shaft; a motor switch; carriage-return drive connections including a driving clutch between said motor shaft and said carriage; control means for closing and opening said switch and engaging and disengaging said driving clutch respectively; means connected to said control means for operating the latter to open said switch and disengage said driving clutch, said operating means including a device normally free of operative driving connection with said motor shaft and being responsive to carriage movement for being clutched to and moved by said motor shaft; and means responsive to carriage return movement for clutching said device to said motor shaft when the carriage approaches the end of its return travel.

19. In a typewriting machine, a frame; a carriage mounted thereon for letter spacing and return movements; an electric motor; a motor switch; carriage return drive connections between said motor and said carriage; control means for opening said switch; a first disc connected to said control means and adapted when rocked to move the control means to open the switch, said disc normally being operatively disconnected from said motor; a second disc connected to said motor to be rotated thereby; and means for clutching said discs together to rock said first disc.

20. In a typewriting machine, a frame; a carriage mounted thereon for letter spacing and return movements; a motor; carriage-return drive connections between said motor and carriage including a clutch having an element shiftable to engage and disengage said clutch;

a shaft; a clutch-operating arm thereon and connected to said shiftable clutch element; a lever mounted to rock about the axis of said shaft and relatively to said arm; means providing driving connection from said lever to said arm only when the lever is rocked in a first direction for positively shifting said element to disengage the clutch; a spring for urging said arm to follow the lever when the latter is rocked in a second and opposite direction for shifting said element to engage said clutch; a lever-moving spring urging said lever in said opposite direction; a key-releasable latch for holding said lever against movement by the lever-moving spring; a first friction disc; a connection between said first friction disc and said lever; a second friction disc driven by said motor and normally being out of driving relation to said first friction disc; and means for effecting frictional driving connection between said two discs for rocking said first disc to move said lever in said first direction to disengage said clutch.

21. In a typewriting machine, a frame; a carriage mounted thereon for letter spacing and return movements; a motor; carriage-return drive connections between said motor and carriage; a control member mounted to move to a first position for interrupting carriage-returning drive by the motor and to a second position for establishing carriage-returning drive by the motor; means for urging said member to said second position; and means for moving said member to and maintaining it in said first position including, for maintaining it in said first position, a pivoted latch engageable with said member, and a catch plate releasably engageable with said latch; key-operated means for moving said catch plate and with it said latch to disengage said latch from said member; and means for disengaging said catch plate from said latch after the latter has been disengaged from said member.

22. In a typewriting machine, a frame; a carriage mounted thereon for letter spacing and return movements; a motor; carriage-return drive connections between said motor and carriage; a control member mounted to move to a first position for interrupting carriage-returning drive by the motor and to a second position for establishing carriage-returning drive by the motor; a spring for urging said member to said second position; motive means operable in response to carriage movement as the carriage approaches the end of its return travel for moving said member to said first position; and means for releasably holding said member in said first position including a latch engageable with said member, a catch plate releasably engageable with said latch and movable to disengage the latch from said member, and cam means for disengaging said catch plate from said latch after the latter has been disengaged from said member.

23. In a typewriting machine, a frame; a carriage mounted thereon for letter spacing and return movements; a motor; carriage-return driving connections between said motor and said carriage; means for starting the drive from said motor to said carriage; means for stopping the drive from said motor to said carriage; a margin stop on said carriage; a center stop mounted on said frame for movement to operative and inoperative positions; a member movably mounted on said frame and positioned to be engaged and moved by said margin stop when the carriage approaches the end of its return movement; means for transmitting movement from said member to said drive-stopping means; and means operatively connected to said center stop and to said member for moving the member out of the path of the margin stop when the center stop is moved to its inoperative position.

24. In a typewriting machine, a frame; a carriage mounted thereon for letter spacing and return movements; a motor; carriage return driving connections between said motor and said carriage; a drive starting and stopping device; and means for actuating said device to stop the drive including a first friction clutch element connected to said drive-stopping device and normally operatively disconnected from the motor, a second friction clutch element connected to be driven by the motor, means for effecting frictional driving connection between said two frictional clutch elements, and means for adjustably fixing the normal clearance between said clutch elements.

25. In a typewriting machine, a main frame; a carriage mounted for letter-spacing and return travel thereon; power-operated carriage return mechanism; a carriage-retarding means including a dash pot device having a reciprocable element and a rockable lever comprising an arm connected to said reciprocable element and being adapted to be disposed in the path of travel of a part on the carriage to be rocked by said part during the last part of the carriage return travel and to thereby drive said dash pot reciprocable element whereby travel of the carriage is smoothly retarded; and means mounting said lever for shifting movement substantially laterally of the line of travel of said carriage part selectively into said path of travel and out of said path of travel respectively.

26. In a typewriting machine, a main frame; a carriage mounted for letter-spacing and return travel thereon; power-operated carriage return mechanism; a carriage-retarding means including a dash pot device having a reciprocable element and a rockable lever comprising an arm connected to said reciprocable element and being adapted to be disposed in the path of travel of a part on the carriage to be rocked by said part during the last part of the carriage return travel and to thereby drive said dash pot reciprocable element whereby travel of the carriage is smoothly retarded; means mounting said lever for shifting movement substantially laterally of the line of travel of said carriage part selectively into said path of travel and out of said path of travel respectively; and a manually operable device for shifting said lever selectively into and out of said path of travel.

27. In a typewriting machine, a main frame; a carriage mounted for letter-spacing and return travel thereon; power-operated carriage return mechanism; a carriage-retarding means including a dash pot device including a reciprocable element and a pivoted lever connected to said reciprocable element and adapted to be disposed in the path of travel of a part on the carriage to be operated by said part during the last part of the carriage return travel; and a shaft mounting said lever for pivotal movement and for shifting movement substantially laterally of the line of travel of said carriage part selectively into said path of travel and out of said path of travel respectively.

WILLIAM O. MICHELSEN.